J. Q. ADAMS.
BEAN SORTING MACHINE.
APPLICATION FILED FEB. 1, 1909.

948,123. Patented Feb. 1, 1910.

WITNESSES:
J. Ray Abbey
Ralph S. Warfield

INVENTOR
John Q. Adams
BY
Geo. B. Willcox
ATTORNEY

UNITED STATES PATENT OFFICE.

JOHN Q. ADAMS, OF VASSAR, MICHIGAN.

BEAN-SORTING MACHINE.

948,123.  Specification of Letters Patent.  Patented Feb. 1, 1910.

Application filed February 1, 1909. Serial No. 475,430.

*To all whom it may concern:*

Be it known that I, JOHN Q. ADAMS, a citizen of the United States, residing at Vassar, in the county of Tuscola and State of Michigan, have invented certain new and useful Improvements in Bean-Sorting Machines; and I do hereby declare the following to be a full, clear, and exact description of the invention, such as will enable others skilled in the art to which it appertains to make and use the same.

My invention relates to sorting machines.

One object of my invention is the provision of a machine by means of which beans may be sorted much more quickly and rapidly than heretofore.

Another object is the provision of a compact machine of simple and inexpensive construction consisting of but few parts not liable to get out of order easily and one which will occupy less space than the machines commonly in use.

A further object is the provision of a machine which will obviate the necessity of picking out and raising the beans by hand.

Beans after being harvested and shelled must be hand picked to remove the broken, discolored and moldy beans. Many attempts have been made to accomplish this work automatically but thus far no one has ever been able to devise a machine for separating discolored beans from the white beans and therefore, hand picking is necessary.

Of the numbers of hand picking machines on the market, those most generally employed consist of a hopper adapted to discharge the beans onto a conveyer from which the operator removes the broken or discolored beans by picking them up between thumb and finger and dropping them into a chute or chutes located at the sides of the conveyer. Naturally this consumes a fraction of a minute and the muscles in the thumb and finger become tired and partially paralyzed from the continuous strain, it being remembered that the conveyer is constantly bringing a layer of beans toward the operator who must remain vigilant at all times.

My invention contemplates the provision of means which will allow the operator to push or cuff the refuse beans off the conveyer without pausing to pick the beans up, thereby economizing time and labor and enabling the operator to pick over a larger number of bushels of beans a day.

To these and other ends, therefore, my invention consists in certain novel features and combinations such as will be more fully described hereinafter and particularly pointed out in the claims.

Figure 1:
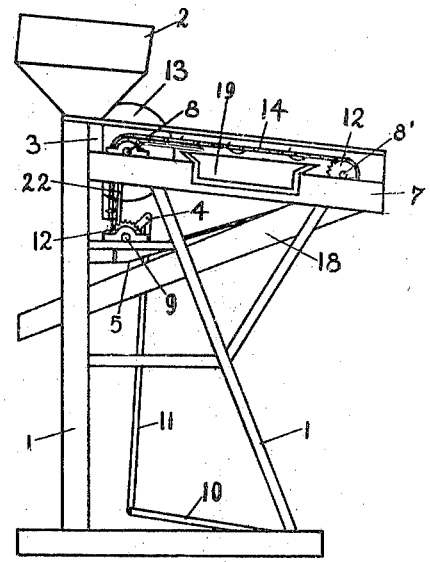
Figure 2:
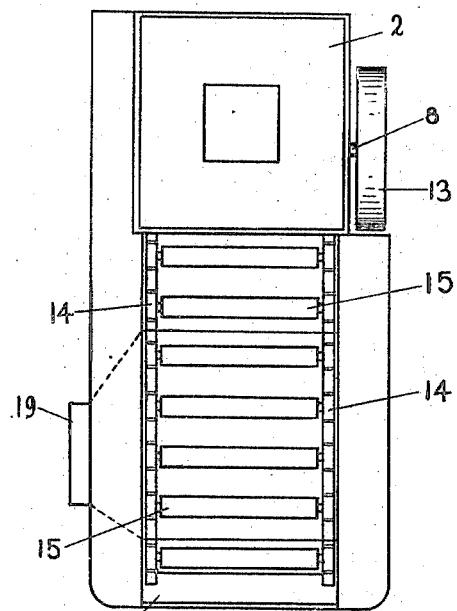
Figure 3:
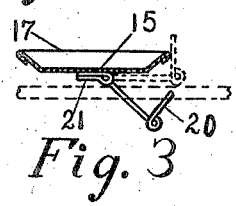
Figure 5:
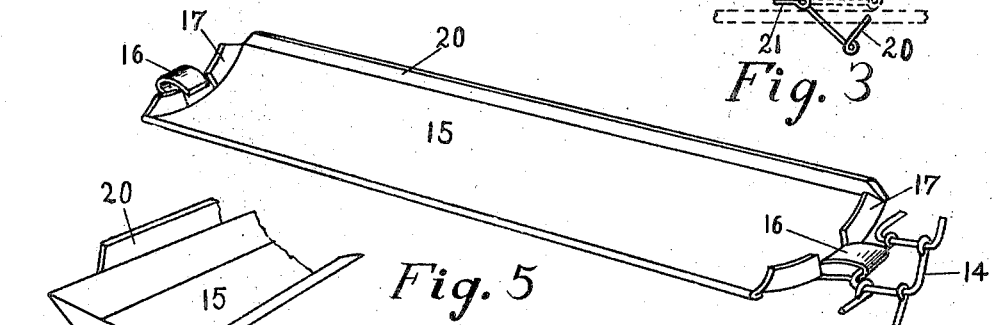
Figure 4:
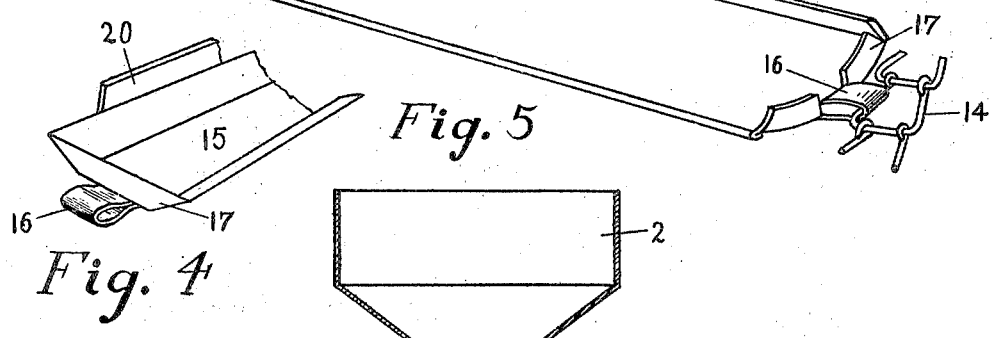
Figure 6:
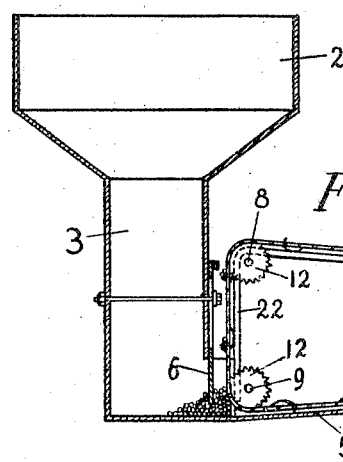

In the accompanying drawings, Figure 1 is a side view of my invention, parts being removed to better illustrate the mechanism, Fig. 2 is a top plan view, Figs. 3 and 4 are detail views of one form of tray, Fig. 5 is a slightly modified form of tray, and Fig. 6 is a detail view of the feed mechanism.

A suitably braced frame mounted on legs 1 supports the operating parts.

A hopper 2 discharges the beans into a spout 3 leading down behind a conveyer 14 to a floor 5 preferably inclined toward the conveyer. As a means for regulating the amount of beans issuing from the spout, one wall 6 of the spout is vertically adjustable to leave a greater or lesser space between the lower end of the adjustable side and the floor 5.

The sorting mechanism is arranged as follows: Arms 7, 7 project horizontally from in front of the hopper, sprocket shafts 8, 8' being journaled at the inner and outer ends of the arms. A third sprocket shaft 9 is journaled in the frame beneath the shaft 8 and just above the floor 5. The shaft 9 is driven in any suitable manner as by means of a treadle 10, a pitman rod 11 and a crank 4 connecting the pitman and the shaft. A balance wheel 13 may be secured to the opposite end of the shaft and sprocket wheels 12 are arranged in pairs on each shaft. A conveyer is mounted on the rollers, such conveyer comprising a pair of parallel sprocket chains 14, 14 of any suitable design adapted to support the dished rectangular trays 15, 15. The trays are provided at opposite ends with projecting ears 16, 16 adapted to connect the trays to the chains. The end edges of the trays are flanged upward as at 17 to prevent the possibility of the contents from rolling off. The longitudinally concaved trays crescent-shaped in cross-section are spaced apart from and parallel with each other. Leading preferably rearwardly at an incline from the forward ends of the arms 7, 7 is a chute 18 into which the trays successively deposit their contents, the chute leading to any suitable receptacle (not shown). Similarly an inclined chute 19 extends laterally from the frame, the head of such last mentioned chute being between the plies of the conveyer and extending under the upper ply from the shaft 8 to the shaft 8'. As one means for causing the trays to automatically take on a load, I may provide each tray with a blade 20 which may be hinged, as shown in Fig. 3 or rigid with the tray, as shown in Fig. 5. In Fig. 3, the blade is hinged to the bottom of the tray as at 21, 21, whereas in Fig. 5, I have shown such blade as being formed integral with the rear longitudinal edge of the tray. The blade is adapted to scoop up a number of the beans piled on the floor 5 at the mouth of the spout 3 and retain them as the trays are elevated.

The operation of my device is as follows: The hopper being filled with beans and the conveyer being started up, the operator will adjust the side wall 6 of the spout above the floor 5 to permit the beans to feed out. The conveyer trays on the lower ply travel along the inclined floor 5 in inverted position and in such rapid succession that the beans cannot roll past the first tray and on down the incline. As the trays successively approach the pile of beans discharged from the mouth of the spout, the blades line up the beans, and just as the conveyer turns around the sprockets on shaft 9, the blades scoop up a load of beans. When traveling from shaft 9 to shaft 8, the beans are supported on the blades, but as the trays round the sprockets on shaft 8, they assume a horizontal position and the beans roll down into the concave trays. The pickers seated at that end of the conveyer nearest the free ends of the arms 7 toward which the trays travel, can, by a flick of the finger, cuff the discolored, broken or damaged beans and refuse off the trays, the discarded beans falling down between the trays onto the head of the transversely extending chute 19, whence they are led to any suitable receptacle, not shown. Each tray contains a sufficient number of beans to permit the operator to look them over thoroughly, the beans left on the trays being delivered into the chute 18 as the conveyer passes around shaft 8'. The hinged blades of the trays are supported in traveling upward between shafts 9 and 8, upon one or more rails 22, which prevent the blades from dropping back of the trays and losing their loads. These rails are continued in a curve around shaft 8 and terminate at points just before the trays are within reach of the operator, thus allowing the blades to drop down out of the way so that the operator may flick or cuff the discarded beans over either longitudinal edge of the tray as preferred. Indeed, all the operator need do is to place his finger on the refuse bean and the movement of the tray will carry the bean over the edge. Obviously, this requires a minimum of exertion and the picking or sorting of beans is accomplished with ease and despatch. The operator may regulate the number of beans scooped up by the trays by means of the adjustable wall 6 and may speed the travel of the conveyer up or down at will, thus gaging his or her capacity for sorting the beans.

From the foregoing it will be observed that I have devised a simple, compact machine of few parts, not liable to get out of order or break down, and capable of permitting the pickers to develop the highest possible speed.

Having thus fully disclosed my invention, what I claim as new, is:—

1. A sorting machine for seeds comprising a conveyer and means for supplying material thereto, the conveyer consisting of a pair of traveling members, and comparatively shallow uninclosed trays supported by the members, the trays being spaced apart from each other to permit the refuse material in the trays cuffed over the sides thereof to fall between the trays.

2. A sorting machine for seeds comprising a conveyer and means for supplying material thereto, the conveyer consisting of a pair of traveling members, shallow trays supported by the members, the trays being spaced apart from each other to permit the refuse material cuffed over the sides thereof to fall between the trays, and blades carried by and projecting above one edge only of the trays.

3. A sorting machine for seeds comprising a conveyer and means for supplying material thereto, the conveyer consisting of a pair of traveling members, trays supported by the members, the trays being spaced apart from each other, and blades hinged to the trays and adapted to project above or depend below one edge thereof.

4. A sorting machine for seeds comprising a conveyer and means for supplying material thereto, the conveyer consisting of a pair of traveling members, and shallow dished trays supported by the members, the trays being spaced apart from each other and of such shape as to permit the seeds to spread out in a single layer thereon.

5. A sorting machine for seeds comprising a conveyer and means for supplying material thereto, the conveyer consisting of a pair of traveling members, trays supported by the members, the trays being spaced apart from each other, blades hinged to the trays and adapted to project above or depend below one edge thereof, and means for supporting the blades in raised position above one edge of the trays throughout a portion of their travel.

6. A sorting machine for seeds, comprising an inclined floor on which the seeds are deposited, traveling trays adapted to be drawn along the floor in inverted position in the direction of the seeds, and blades on one longitudinal edge of each tray adapted to scoop up and retain a portion of the seeds from the floor.

7. In a seed sorting machine, a series of shallow trays carried by endless traveling bands and spaced apart from each other, the opposite end edges of the trays being flanged upwardly, and a blade carried at one longitudinal edge of each tray, such blade extending at an angle to the tray.

8. A sorting machine for seeds comprising a supply hopper, an endless conveyer traveling through a triangular course, one approximately vertical leg of which lies adjacent the supply hopper, the conveyer including a series of trays spaced apart from each other, and means on the trays for scooping up a portion of the material as it passes the supply hopper, and retaining the material in place as the trays ascend the vertical leg.

9. A seed sorting machine comprising a series of traveling shallow trays spaced apart from each other a distance great enough to permit the seeds cuffed over the sides of the trays to fall between the trays, an off-carrying chute onto which the seeds so cuffed fall and by which they are conveyed away, the trays so formed as to permit the seeds to be cuffed off from either side thereof in a direction parallel with the direction of travel of the trays.

10. A seed sorting machine comprising a supply hopper, and a series of traveling trays spaced apart from each other, flanges at the ends of the trays, a blade carried by each tray and adapted to scoop up and support a portion of the seeds throughout a part of the travel of the trays, endless chains, and means connecting the trays to the chains.

11. A seed sorting machine comprising a series of uninclosed traveling shallow trays, the longitudinal sides of which are slightly inclined, and means for supplying material to the trays, the trays being spaced apart from each other to permit the material cuffed off the trays to fall between each two adjacent trays.

12. A seed sorting machine comprising a series of traveling trays spaced apart from each other, two opposite edges of each tray being inclined and a blade hinged to each tray, a supply adapted to be engaged by the blade, the free edge of the blade adapted to drop below the adjacent edge of the tray throughout a portion of its travel.

13. A seed sorting machine comprising a pair of endless traveling members, a series of shallow trays carried by the members and spaced apart from each other, a refuse receiving chute, the head of which is received between the piles of the endless members to receive material cuffed over the sides of the trays, a supply hopper past which the trays travel, means carried by the trays and adapted to scoop up a load as the trays pass the hopper, and a rail over which the trays pass during a portion of their travel for retaining the trays in position.

In testimony whereof, I affix my signature in presence of two witnesses.

JOHN Q. ADAMS.

Witnesses:
RALPH S. WARFIELD,
CHRISTINE A. BRAIDEL.